United States Patent [19]
Holland

[11] Patent Number: 6,089,803
[45] Date of Patent: Jul. 18, 2000

[54] PICKUP TRUCK BED CARGO BARRIER

[76] Inventor: George G. Holland, 2016 Camellia Way, Woodburn, Oreg. 97071

[21] Appl. No.: 09/270,931

[22] Filed: Mar. 16, 1999

[51] Int. Cl.$^7$ ........................................................ G60P 7/14
[52] U.S. Cl. .......................... 410/129; 410/121; 410/140; 410/143
[58] Field of Search .................................. 410/121, 129, 410/140, 143–145, 151; 296/3; 224/403, 42.33, 42.34, 552; 220/528, 529, 552

[56] References Cited

U.S. PATENT DOCUMENTS

| | | | |
|---|---|---|---|
| 4,507,033 | 3/1985 | Boyd | 410/104 |
| 4,720,222 | 1/1988 | Nagy | 410/151 |
| 4,772,165 | 9/1988 | Bartkus | 410/139 |
| 5,265,993 | 11/1993 | Wayne | 410/129 |
| 5,427,486 | 6/1995 | Green | 410/118 |
| 5,586,850 | 12/1996 | Johnson | 410/138 |
| 5,941,565 | 8/1999 | Clendenin, Jr. | 296/3 X |
| 5,975,819 | 11/1999 | Cola | 410/129 |

FOREIGN PATENT DOCUMENTS

3238908A1   4/1984   Germany ............................... 224/552

*Primary Examiner*—Stephen T. Gordon

[57] ABSTRACT

A cargo barrier device that restrains cargo in a pickup truck bed from tipping or moving longitudinally or laterally. Additionally, if cargo items require complete constraint they can be secured firmly to the transverse member by elastic cords with end hooks that are engaged over the upper flange of the transverse member. This device can be located at either end of the truck bed for convenient accessibility. The cargo barrier device would normally be positioned at the aft end of the truck bed when a truck bed canopy is installed and in the forward end if the truck bed is uncovered. The cargo barrier device is comprised of a transverse member and two fore and aft members attached perpendicularly to the transverse member. These three members firmly abut against the truck bed wheel well and tailgate in the aft position and truck bed wheel well and forward endwall in the forward position. Therefore, the cargo barrier device, in either position, is fixed against translation or rotation in the plane of the truck bed. The cargo barrier device requires no attachment to the truck bed. It can be used whether of not a bed liner has been installed on the truck bed.

7 Claims, 2 Drawing Sheets

PICKUP TRUCK BED CARGO BARRIER

CROSS-REFERENCE TO RELATED APPLICATIONS

Not Applicable

BACKGROUND

1. Field of Invention

This invention relates to a cargo barrier to restrain cargo in a pickup truck bed or like cargo conveyance.

2. Description of Prior Art

Pickup trucks and the like, with canopies over the cargo bed, provide access to the cargo only from the aft end of the bed through the tailgate. It is desirable to retain small cargo items, such as bags of groceries, near the tailgate for accessibility. However, if the bed is empty in front of these cargo items they will move forward when the vehicle decelerates and tip over due to angular acceleration when it corners. Since deceleration g-forces are generally much higher than acceleration g-forces, on this type of vehicle, the aforementioned cargo items inevitably end up at the front of the truck bed and tipped out of their bags.

A restraining bar, as proposed in U.S. Pat. No. 4,720,222 (1988) to Nagy, can restrain only large cargo items from moving forward or aft. Small items could pass beneath the bar. Also, items of cargo would not be restrained against transverse movement, which could result in lateral tipping of unstable cargo items. There is no capability of tying down large cargo items to prevent movement in any direction with this restraining bar. Adjusting and positioning the bar in the bed of a pickup truck without a canopy would involve manipulation from both sides of the truck bed. If the truck had a canopy, installing the bar forward of the wheel well would require the uncomfortable act of climbing into the pickup truck bed.

A portable divider device, presented in U.S. Pat. No. 4,733,899 (1988) to Keys, prevents cargo from moving longitudinally along the truck bed. It does not provide lateral restraint for the cargo. When the vehicle corners, the cargo, such as bags of groceries, could tip over and be damaged. The whole assembly is not firmly held in place in the truck bed. It could move aft away from the wheel well support as the vehicle is operated and the whole assembly could rotate into a fore and aft position, allowing the cargo to slide to the front of the truck bed. The capability of tying down cargo items of large mass or size is not provided by this divider device.

SUMMARY

In accordance with the present invention a pickup truck bed cargo barrier comprises a transverse member and fore and aft members which jointly restrain cargo in lateral and longitudinal directions.

Objects and Advantages

Accordingly, several objects and advantages of my cargo barrier device are:

(a) to provide a pickup truck bed cargo barrier that restrains small and large cargo items from moving longitudinally or laterally;

(b) to provide a pickup truck bed cargo barrier that restrains cargo items from tipping in any direction;

(c) to provide a pickup truck bed cargo barrier that is held fixed horizontally;

(d) to provide a pickup truck bed cargo barrier that is simple to install and remove;

(e) to provide a pickup truck bed cargo barrier that can be used whether or not a bed liner is present; and (f) to provide a pickup truck bed cargo barrier that is lightweight, inexpensive to manufacture, and of simple construction.

Further objects and advantages will become apparent from a consideration of the ensuing description and drawings.

DRAWING FIGURES

Figure 1:
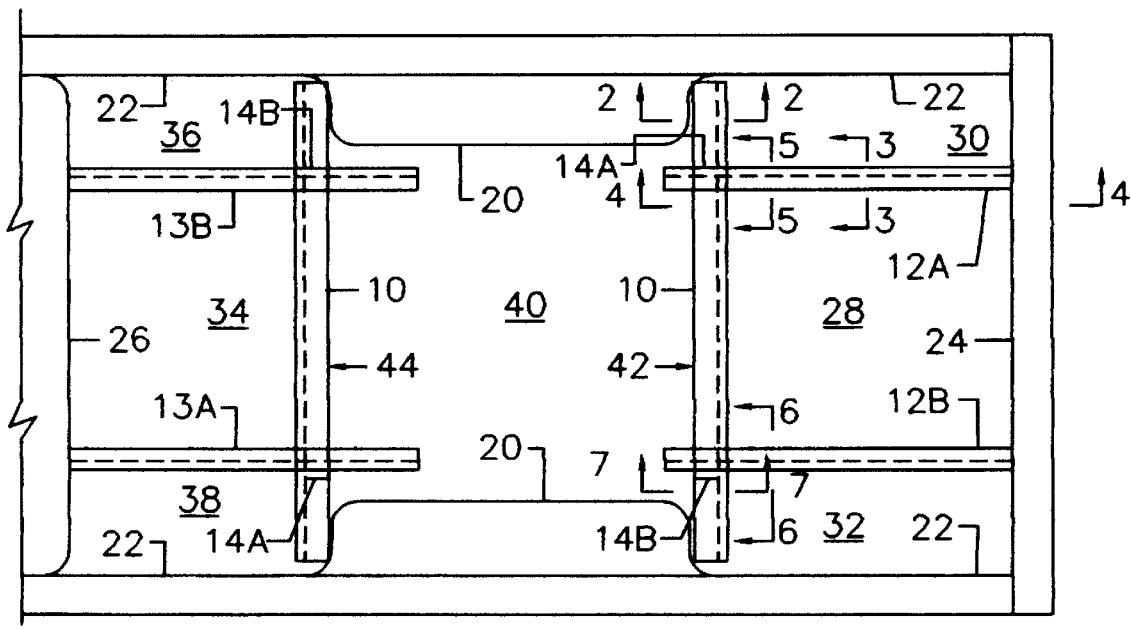
FIG. 1 shows a plan view of the pickup truck cargo barrier in two positions on the bed of the pickup truck.

REFERENCE NUMERALS IN DRAWINGS 10 transverse member
12A fore and aft member—aft position
12B fore and aft member—aft position(opposite hand of 12A)
13A fore and aft member—forward position
13B fore and aft member—forward position (opposite hand of 13A)
14A attachment stiffener
14B attachment stiffener (opposite hand of 14A)
16A indexing hole in 14A
16B indexing hole in 14B
18A elongated hole in 10 to accommodate 12A or 13B
18B elongated hole in 10 to accommodate 12B or 13A
19 elastic cord with end hooks
20 pickup truck bed wheel well
22 pickup truck bed sidewall
24 pickup truck bed tailgate
26 pickup truck bed forward endwall
28 pickup truck bed aft of wheel well, center compartment
30 pickup truck bed aft of wheel well, right side compartment
32 pickup truck bed aft of wheel well, left side compartment
34 pickup truck bed forward of wheel well, center compartment
36 pickup truck bed forward of wheel well, right side compartment
38 pickup truck bed forward of wheel well, left side compartment
40 pickup truck bed between wheel wells
42 cargo barrier device in aft position
44 cargo barrier device in forward position

DESCRIPTION

FIG. 1 Device Components

FIG. 1 shows a plan view of my cargo barrier device positioned in two possible locations on the bed of a generic pickup truck. The components of this device are: (1) a transverse member 10; (2) two fore and aft members 12A and 12B when the device is in the aft position; (3) two fore and aft members 13A and 13B when the device is in the forward position; and (4) attachment of transverse member 10 to either fore and aft members 12A and 12B or fore and aft members 13A and 13B.

Figure 2:
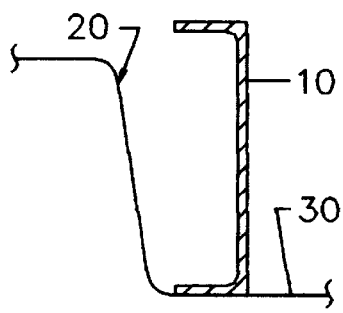
FIG. 2 is a cross-sectional view on line 2—2 of FIG. 1.

FIGS. 1, 2 Transverse Member

Figure 7:
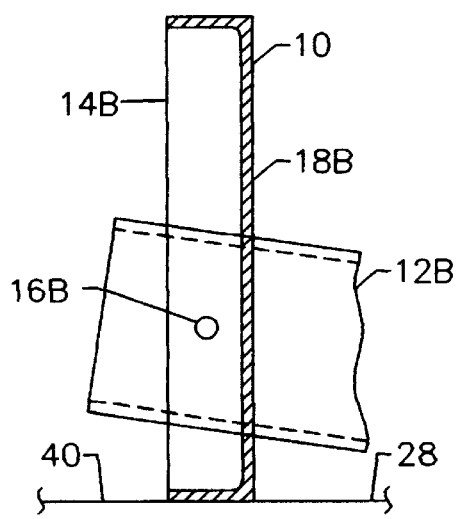
FIG. 7 is a cross-sectional view on line 7—7 of FIG. 1.

The length range of transverse member 10 is from the width of the horizontal plane of the pickup truck bed (sum of widths of 28, 30, and 32) to four inches less than that width. Its height range is from the height of pickup truck bed sidewall 22 to the height of pickup truck bed wheel well 20. Member 10 has a constant C-section cross-section with uniform thickness throughout. Referring to FIG. 2 cross-section, both flange widths are equal and approximately ten percent of the height of member 10. The thickness of member 10 is approximately one percent of the height of member 10. When cargo barrier device 42 is in the aft position (FIG. 1) the member 10 cross-section is open forward. At both ends of member 10 the forward edge of the lower flange firmly abuts the aft face of wheel well 20. When cargo barrier device 44 is in the forward position (FIG. 1) member 10 cross-section is open aft. At both ends of member 10 the aft edge of the lower flange firmly abuts the forward face of wheel well 20. Integral vertical attachment stiffeners 14A and 14B (FIGS. 1, 7) are located at approximately nine inches from each end of member 10. Stiffeners 14A and 14B are the same thickness as member 10.

Figure 3:
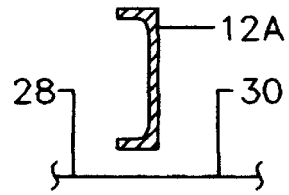
FIG. 3 is a cross-sectional view on line 3—3 of FIG. 1.

FIGS. 1, 3 Fore and Aft Members

The length of fore and aft members 12A, 12B, 13A, and 13B is two inches greater than the distance between the aft face of wheel well 20 and the forward face of tailgate 24 in its closed position. The length of truck bed compartments 30 and 32, aft of wheel well 20, is consistently greater than the length of truck bed compartments 36 and 38, forward of wheel well 20, for a majority of pickup trucks. Therefore, the length of members 12A, 12B, 13A, and 13B, when determined as described above, will be adequate when the cargo barrier device 44 is disposed forward of wheel well 20 and members 13A and 13B are used. The only difference between members 12A and 12B and members 13A and 13B is the location of attachment holes 16A and 16B. Therefore, one set of members 12A and 12B can be used in both forward 44 and aft 42 positions of the cargo barrier device. Referring to FIG. 3 cross-section, both flange widths are equal and half the width of the flanges on member 10. The thickness of members 12A, 12B, 13A, and 13B is the same as that of member 10. The cross-sections of members 12A, 12B, 13A, and 13B are open inboard in either cargo barrier device disposition 42 or 44, shown in FIG. 1. Members 12A, 12B, 13A, and 13B are identical except that the location of attaching holes 16A and 16B in members 12A and 12B is different than that in members 13A and 13B.

Member 10 and members 12A, 12B, 13A, and 13B will be made of impact-resistant thermo-plastic material.

FIGS. 4, 5, 6, 7 Member Attachment In Aft Position

Figure 4:
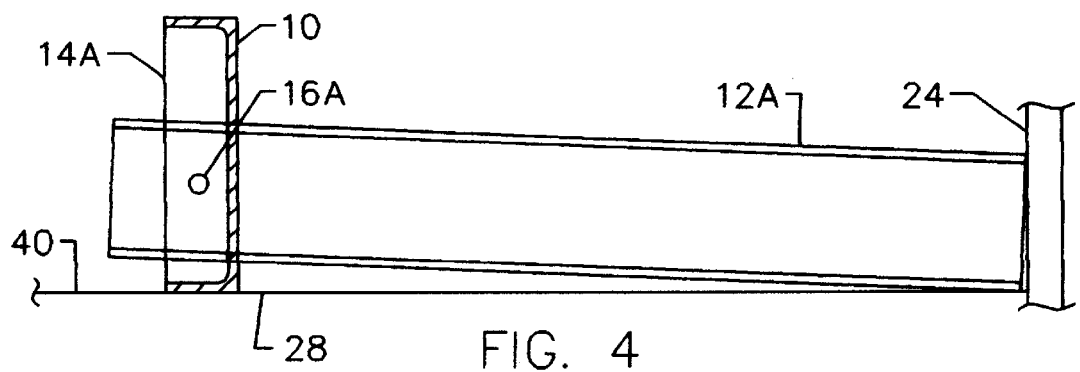
FIG. 4 is a cross-sectional view on line 4—4 of FIG. 1.
Figure 6:
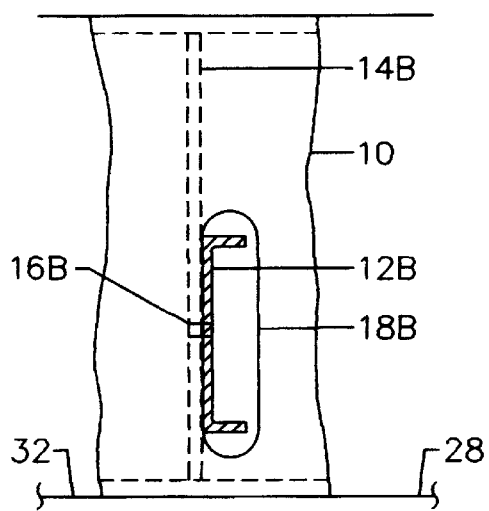
FIG. 6 is a cross-sectional view on line 6—6 of FIG. 1.
Figure 5:
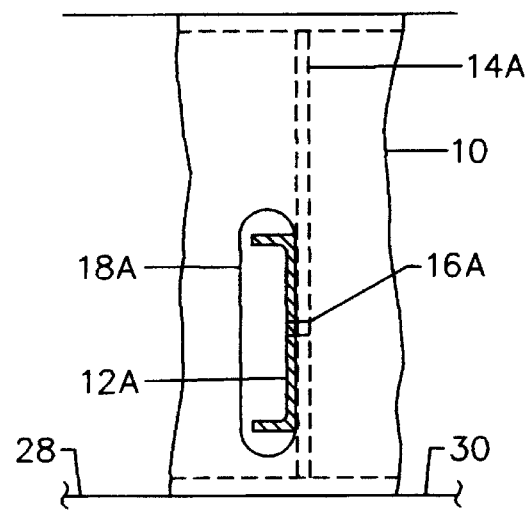
FIG. 5 is a cross-sectional view on line 5—5 of FIG. 1.

Fore and aft members 12A and 12B are attached to transverse member 10 in the following sequence:

(1) Member 10 is positioned with its major cross-sectional axis vertical, the lower flange lying flat against truck bed 28, 30, and 32 and the free edge of the lower flange firmly abutted to the aft face of wheel well 20 at each end of member 10 (FIGS. 1, 2);

(2) the forward end of each member 12A and 12B is inserted through the holes 18A and 18B, respectively, in member 10 with the flanges of members 12A and 12B extending inboard (FIGS. 1, 3);

(3) the aft end of each member 12A and 12B is abutted firmly to tailgate 24 and allowed to rest on truck bed 28 (FIG. 4);

(4) the forward end of each member 12A and 12B is centered vertically in elongated holes 18A and 18B, respectively, in member 10 (FIGS. 5, 6);

(5) the locations of indexing holes 16A and 16B (FIGS. 4, 7) in member 10 attachment stiffeners 14A and 14B are marked on the webs of members 12A and 12B and bolt holes are drilled at those locations;

(6) the installation of bolts through the webs of members 12A and 12B in common with stiffeners 14A and 14B, respectively, completes assembly of cargo barrier device 42 (FIG. 1).

FIG. 1 Member Attachment In Forward Position

When cargo barrier device 44 is located in the forward position (FIG. 1) the installation procedure is identical to that for the aft position 42, described above, with the following exceptions:

(1) member 10 lower flange free edge is firmly abutted to the forward face of wheel well 20 at each end of member 10 (FIG. 1);

(2) the forward end of each member 13A and 13B is firmly abutted to pickup truck bed forward endwall 26 of truck bed 34.

To preclude the need for tools to assemble or disassemble the device, wing nuts are used. The bolts, wing nuts, and washers are made of stainless steel to prevent corrosion due to exposure to the elements.

Advantages

A number of advantages become evident from the above description:

(1) The cargo barrier device has a minimum number of parts.
(2) It is easily assembled and disassembled without tools.
(3) It is easily manipulated since it is lightweight.
(4) It can be stored in a small space when it is disassembled.
(5) When long items are transported requiring that the tailgate be down, and the cargo device is in the aft position, the long cargo items will rest on the cargo barrier device. Thus, these cargo items will slope forward, inhibiting them from sliding aft when the vehicle accelerates.

Figure 8:
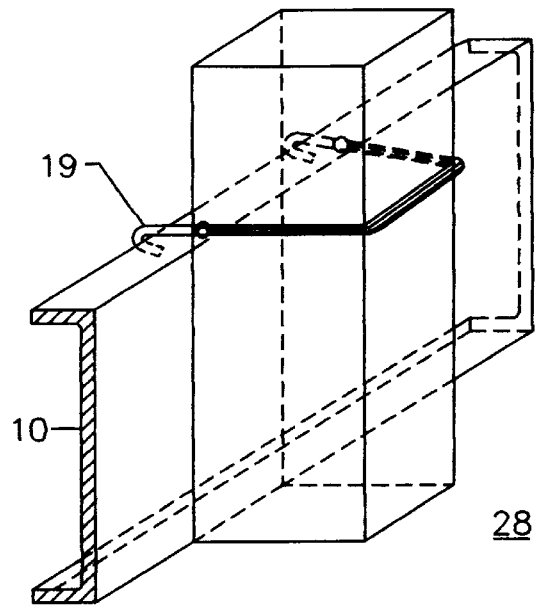
FIG. 8 is an isometric view of cargo being constrained by an elastic cord.

Operation—FIGS. 1, 8

Cargo barrier device 42, in the aft position (FIG. 1), retains cargo in the aft truck bed compartments 28, 30, and 32 so that it is readily accessible from outside the rear of the truck. This position of device 42 would most likely be used when the truck bed has a canopy attached and access to the bed is only through the door at the tailgate.

Cargo barrier device 44, in the forward position (FIG. 1), retains cargo in the forward truck bed compartments 34, 36, and 38. This position of device 44 would most likely be used if there were no canopy on the truck bed. In this position, cargo would be accessible from either side of the truck bed.

With the cargo barrier device in either position 42 or 44, it effectively prevents cargo in any compartment from intermingling with cargo in any other compartment.

The device, whether in aft position 42 or forward position 44 (FIG. 1), will restrain cargo movement, both longitudinally and laterally, while the truck is accelerating, decelerating, or cornering. This is accomplished in three ways by member 10 and members 12A, 12B, 13A, and 13B.

First, cargo items such as bags of groceries, when placed in small compartments 30, 32, 36, and 38 (FIG. 1) adjacent to sidewalls 22, are constrained from tipping and sliding laterally by members 12A, 12B, 13A, and 13B and sidewalls 22. In addition, cargo items in these compartments are constrained from tipping and sliding longitudinally by member 10. Loose items as small as one and one half inches high can be contained in these four aforementioned compartments.

Second, large cargo items placed in truck bed compartments 28 or 34 (FIG. 1) are restrained from tipping or sliding longitudinally by member 10.

Third, if cargo items require complete constraint against movement in any direction, they can be secured firmly against member 10 by elastic cords with end hooks 19. These hooks are engaged over the upper flange of member 10 (FIG. 8) with the cord 19 under tension.

The flanges on both member 10 and members 12A, 12B, 13A, and 13B provide stiffness normal to their major cross-sectional axes so that these members will be rigid and have sufficient strength to withstand loads imposed on them.

Conclusion, Ramifications, and Scope

Accordingly, the reader will see that the cargo barrier of the invention provides a means of restraining cargo at either end of a pickup truck bed from tipping or moving laterally and moving out of reach longitudinally. In addition, cargo can be constrained in a fixed position through the use of elastic cords combined with the cargo barrier device. Furthermore, the cargo barrier is easy to install and remove, simple to assemble and disassemble, lightweight, inexpensive to manufacture, and of simple construction.

While the above description contains many specificities, these should not be construed as limiting the scope of the invention but rather as providing illustrations of presently preferred embodiments of this invention. For example, the cargo barrier could have more than two fore and aft members. Also, the members of the invention could be made from aluminum alloy, either extrusions or formed sheets, or plywood. The use of these different materials would entail separate attachment members but not a concept change.

The scope of the invention should be determined by the appended claims and their legal equivalents, rather than by the examples given.

I claim:

1. A cargo barrier device system for restraining cargo in lateral and/or longitudinal directions on the bed of a pickup truck, comprising:
   (a) an elongated transverse member having first and second elongated flanged edges intercepted by opposite end edges and adapted to extend transversely across a pickup truck bed with said transverse member positioned with its major cross-sectional axis vertical and having a height less than that of the sidewall of said pickup truck bed and said first elongated flanged edge to lie on said pickup truck bed but unattached thereto with said end edges adjacent said pickup truck bed sidewalls, and
   (b) a plurality of elongated fore and aft members having first and second elongated flanged edges intercepted by opposite end edges and positioned with major cross-sectional axes vertical and with predetermined length and having a height less than said transverse member and unattached to said pickup truck bed, and
   (c) a plurality of vertical faying stiffeners that are integral to said transverse member and extend from one said flanged edge of said transverse member to the other flanged edge of said transverse member and provide a means for joining said fore and aft members to said transverse member, and
   (d) said fore and aft members being joined perpendicularly to said transverse member, and
   (e) an attaching means for attaching said fore and aft members to said transverse member that facilitates an adjustable portion of a length of said fore and aft members extending through said transverse member, and
   (f) whereby cargo can be restrained horizontally on said pickup truck bed.

2. The cargo barrier device system of claim 1 wherein said cargo barrier device is disposed aft of a wheel were of said pickup truck bed,
   (a) said transverse member being abutted against an aft face of the wheel well of said pickup truck bed, and
   (b) said fore and aft members adapted to abut against a tailgate of said pickup truck bed.

3. The cargo barrier device system of claim 1 wherein said cargo barrier device is disposed forward of a wheel well of said pickup truck bed,
   (a) said transverse member being abutted against a forward face of said wheel well of said pickup truck bed, and
   (b) said fore and aft members adapted to abut against a forward endwall of said pickup truck bed.

4. The cargo barrier device system of claim 2 wherein the abutting of said transverse member against said wheel well coincidentally with abutting of the ends of said fore and aft members against said tailgate fixes the said cargo barrier device in place horizontally.

5. The cargo barrier device system of claim 3 wherein the abutting of said transverse member against said wheel well coincidentally with abutting of the ends of said fore and aft members against said forward endwall of said pickup truck bed fixes said cargo barrier device in place horizontally.

6. The cargo barrier device system of claim 1 wherein said transverse member and said fore and aft members are made of impact-resistant thermo-plastic.

7. The cargo barrier device system of claim 1 wherein an elastic cord with attached end hooks is pulled firmly around a cargo item and each end of said elastic cord hooked over the flanged edge of said transverse member on either side of said cargo item.

* * * * *